United States Patent
Adams

(10) Patent No.: US 10,095,557 B2
(45) Date of Patent: Oct. 9, 2018

(54) SYSTEM AND METHOD TO PROVIDE SINGLE THREAD ACCESS TO A SPECIFIC MEMORY REGION

(75) Inventor: Nicholas J. Adams, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 13/537,378

(22) Filed: Jun. 29, 2012

(65) Prior Publication Data

US 2014/0007133 A1 Jan. 2, 2014

(51) Int. Cl.
*G06F 9/44* (2018.01)
*G06F 9/52* (2006.01)

(52) U.S. Cl.
CPC .................. *G06F 9/526* (2013.01)

(58) Field of Classification Search
CPC ... G06F 9/3842; G06F 9/3834; G06F 12/0815
See application file for complete search history.

(56) References Cited

U.S. PATENT DOCUMENTS

| | | | | |
|---|---|---|---|---|
| 5,974,438 | A * | 10/1999 | Neufeld | G06F 9/4881 711/144 |
| 7,493,618 | B2 * | 2/2009 | Michael | G06F 9/526 707/999.008 |
| 7,856,537 | B2 * | 12/2010 | Kumar et al. | 711/152 |
| 8,392,929 | B2 * | 3/2013 | Taillefer et al. | 718/104 |
| 2003/0066012 | A1 * | 4/2003 | Quach | G06F 11/1008 714/763 |
| 2011/0109585 | A1 * | 5/2011 | Kwon | G06F 3/0418 345/174 |
| 2011/0145530 | A1 * | 6/2011 | Taillefer et al. | 711/163 |

OTHER PUBLICATIONS

J. Greggory Steffan, "A scalable approach to thread-level speculation", May 2000, vol. 28 Issue 2.*
https://web.archive.org/web/20111017075841/http://en.wikipedia.org/wiki/Lock_(computer_science).*
Wikipedia, "Model-specific register", 2011.*
Wayback machine 2011 for "Model-specific register".*

* cited by examiner

*Primary Examiner* — Wynuel Aquino
(74) *Attorney, Agent, or Firm* — Nicholson De Vos Webster & Elliott LLP

(57) ABSTRACT

Processing logic and a method to provide single thread access to a specific memory region without suspending processing activity for all other cores and/or threads within or in association with a processor, computer system, or other processing apparatus. Single thread access may be provided through implementation of microcode which may control thread access to model specific registers ("MSRs") within a processor. One MSR may provide a mutex, which a single thread may claim, and another MSR may provide a range of memory locations, which may be accessed by the thread that has claimed the mutex.

22 Claims, 5 Drawing Sheets

SYSTEM AND METHOD TO PROVIDE SINGLE THREAD ACCESS TO A SPECIFIC MEMORY REGION

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Advances in semi-conductor processing and logic design have permitted an increase in the amount of logic that may be present on integrated circuit devices. As a result, computer system configurations have evolved from a single or multiple integrated circuits in a system to multiple cores that can execute multiple hardware threads in parallel on individual integrated circuits (e.g., individual semiconductor chips). A processor or integrated circuit typically comprises a single physical processor die, where the processor die may include any number of cores, each that can execute a respective hardware thread. The ever increasing number of processing elements (e.g., cores) on integrated circuits enables more tasks to be accomplished in parallel. However, the execution of more threads and tasks put an increased premium on decoding task instructions, and the management thereof.

Current processing and logic for a processor provides the ability to enter a system management mode ("SMM"). To enter SMM, the processor issues a system management interrupt ("SMI") which sets the processor into SMM. Upon entering SMM, a single selected thread within the processor is allowed access to a dedicated SMM memory region to perform system critical processing. Processing for all other unselected cores and/or threads is suspended while the selected thread performs the system critical processing using the dedicated SMM memory region. Upon exiting SMM, the unselected cores continue their respective prior processing functions.

Because processing activity during SMM is limited to the single selected thread, processing efficiency for the processor is negatively impacted. Accordingly, a need in the art exists to provide single thread access to a specific memory region without suspending processing for all other cores and/or threads within a processor.

DESCRIPTION OF THE FIGURES

Embodiments are illustrated by way of example and not limitation in the Figures of the accompanying drawings.

DETAILED DESCRIPTION

Figure 1A:
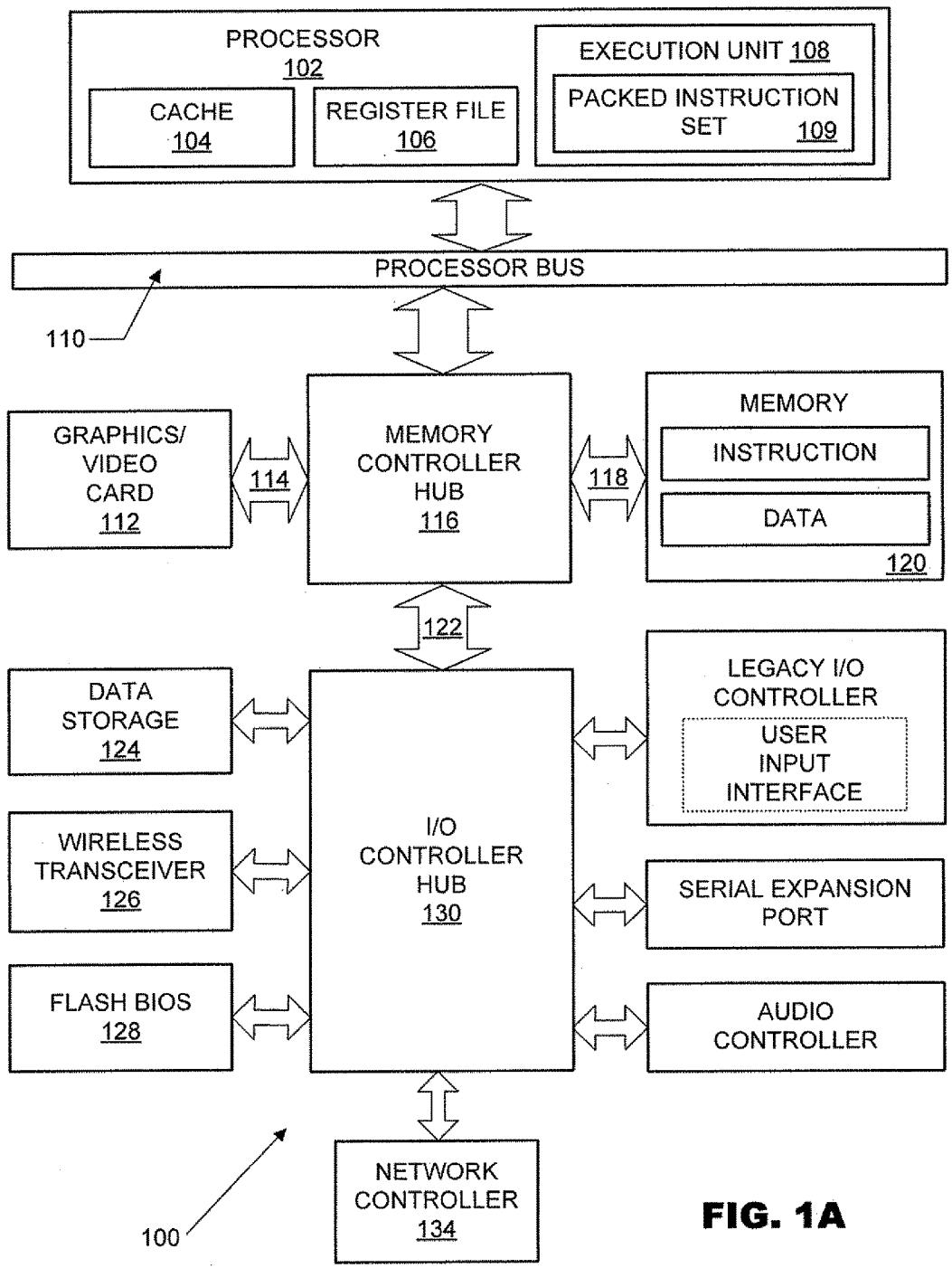
FIG. 1A is a block diagram of a system according to one embodiment.

The following description describes instructions and processing logic to provide single thread access to a specific memory region without suspending processing activity for all other cores and/or threads within or in association with a processor, computer system, or other processing apparatus. Single thread access may be provided through implementation of microcode or "firmware" may control thread access to model specific registers ("MSRs") within a processor. One MSR may provide a mutex, which a single thread may claim, and another MSR may provide a range of memory locations, which may be accessed by the thread that has claimed the mutex. A thread possessing the mutex may read and/or write to/from the memory location range. A thread not possessing the mutex may be denied read/write access from the memory location range. When a thread not possessing the mutex attempts to read and/or write the memory location range, an error code may be returned to the thread indicating that the memory range is inaccessible to the thread.

In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory ("CD-ROMs"), and magneto-optical disks, Read-Only Memory ("ROMs"), Random Access Memory ("RAM"), Erasable Programmable Read-Only Memory ("EPROM"), Electrically Erasable Programmable Read-Only Memory ("EEPROM"), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output ("I/O").

In one embodiment, the instruction set architecture ("ISA") may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table ("RAT"), a Reorder Buffer ("ROB") and a retirement register file). In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data ("SIMD") refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions ("SSE"), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology ("ICT") of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM° 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants ("PDAs"), and handheld PCs. Embedded applications can include a micro controller, a digital signal processor ("DSP"), system on a chip, network computers ("NetPC"), set-top boxes, network hubs, wide area network ("WAN") switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 ("L1") internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer registers.

Execution unit 108, including logic to perform integer and floating point operations, also resides in the processor 102. The processor 102 also includes a microcode ("ucode") ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory ("DRAM") device, a static random access memory ("SRAM") device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub ("MCH"). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port ("AGP") interconnect 114.

System 100 uses a proprietary hub interface bus 122 to couple the MCH 116 to the I/O controller hub ("ICH") 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
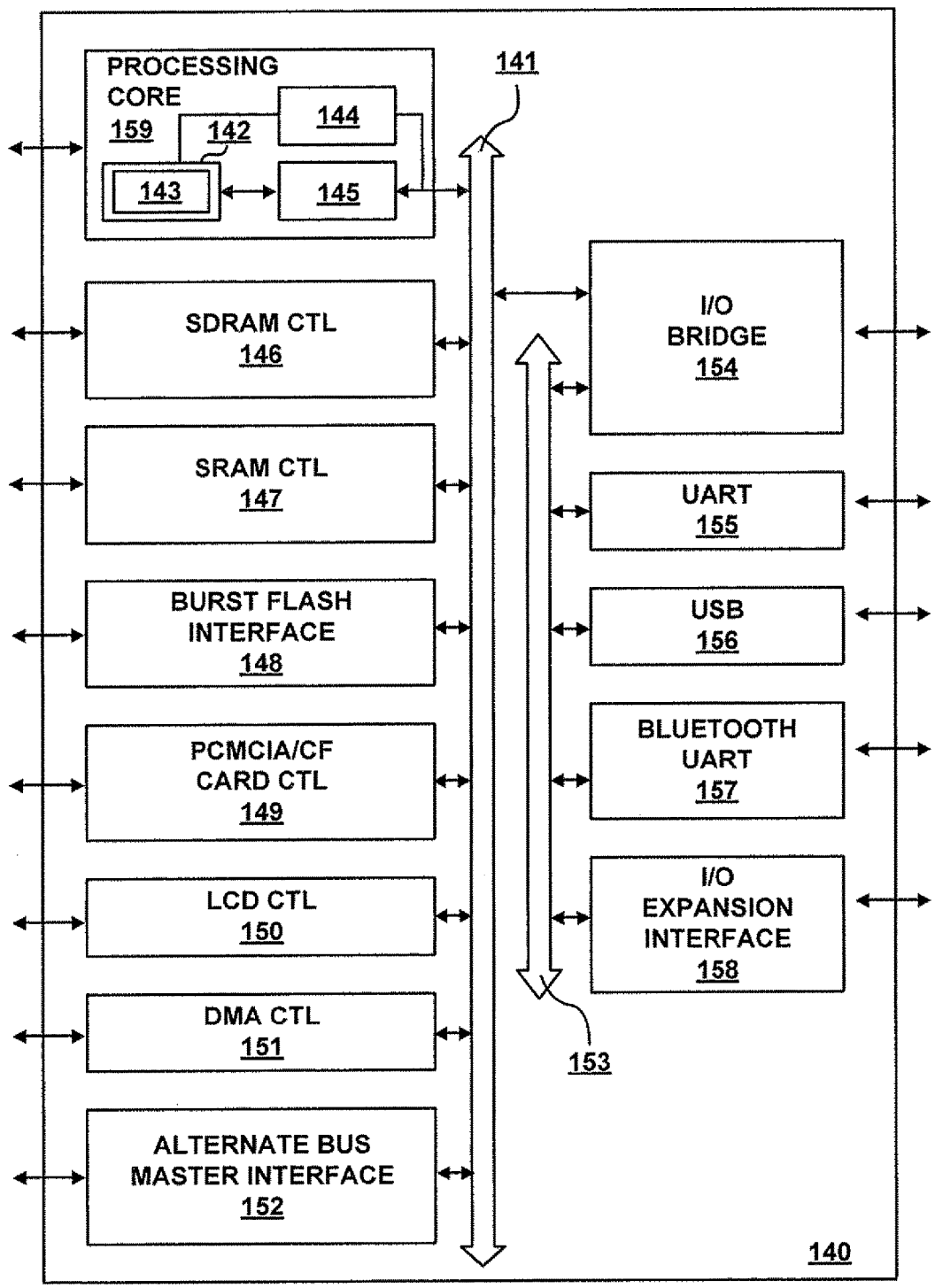
FIG. 1B illustrates a data processing system according to one embodiment.

FIG. 1B illustrates a data processing system 140 which implements the principles of one embodiment of the present invention. It will be readily appreciated by one of skill in the art that the embodiments described herein can be used with alternative processing systems without departure from the scope of embodiments of the invention.

Computer system 140 comprises a processing core 159 capable of performing at least one instruction in accordance with one embodiment. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present invention. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory ("SDRAM") control 146, static random access memory ("SRAM") control 147, burst flash memory interface 148, personal computer memory card international association ("PCMCIA")/compact flash (CF) card control 149, liquid crystal display ("LCD") control 150, direct memory access ("DMA") controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter ("UART") 155, universal serial bus ("USB") 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform ("FFT"), a discrete cosine transform ("DCT"), and their respective inverse transforms; compression/decompression techniques such as color space transformation, video encode motion estimation or video decode motion compensation; and modulation/demodulation ("MODEM") functions such as pulse coded modulation ("PCM").

Figure 2:
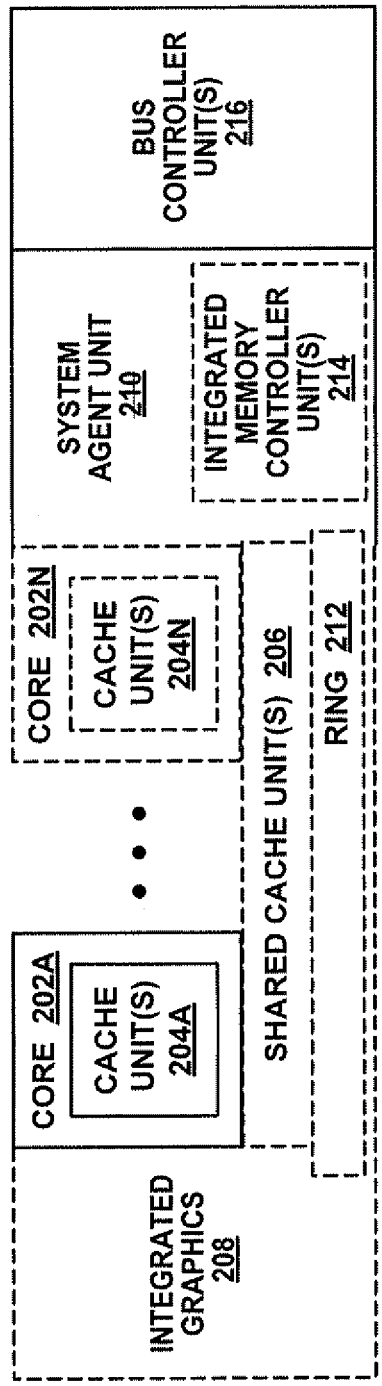
FIG. 2 is a block diagram of a processor according to one embodiment.

FIG. 2 is a block diagram of a single core processor and a multicore processor 200 with integrated memory controller and graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and an integrated graphics logic 208.

The memory hierarchy includes one or more levels of cache within the cores, a set of one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210, alternative embodiments may use any number of well-known techniques for interconnecting such units. In some embodiments, one or more of the cores 202A-N are capable of multi-threading.

The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture and/or instruction set. For example, some of the cores 202A-N may be in order while others are out-of-order. As another example, two or more of the cores 202A-N may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor 200 may be implemented on one or more chips. The processor 200 may be a part of and/or may be implemented on one or more substrates using any of a number of process technologies, such as, for example, BiCMOS, CMOS, or NMOS.

Various system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are suitable for incorporating the processor 200. In general, a huge variety of systems or electronic devices capable of incorporating a processor and/or other execution logic as disclosed herein are generally suitable.

Figure 3:
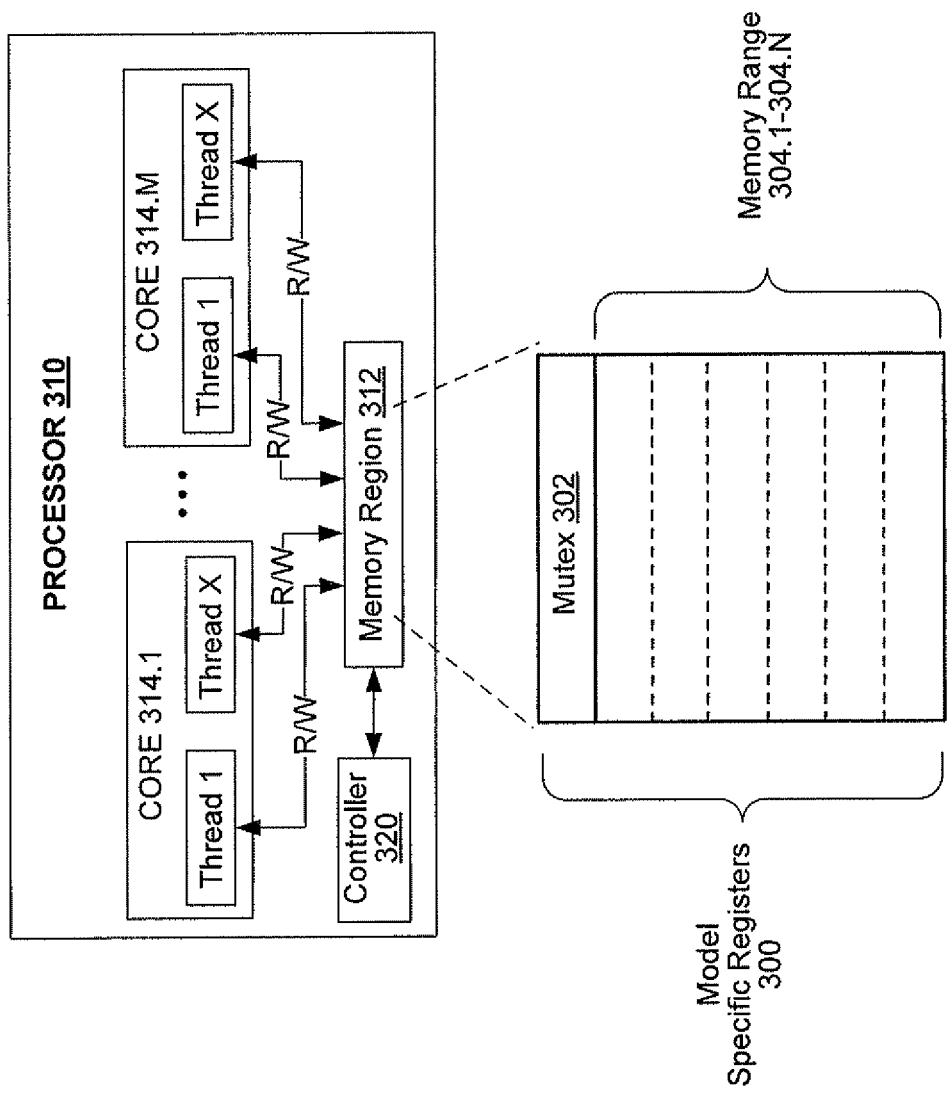
FIG. 3 is a block diagram of a processor according to one embodiment.

FIG. 3 is a block diagram of model specific registers ("MSRs") 300 to provide single thread access to a specific memory range according to one embodiment of the present invention. As illustrated in FIG. 3, the MSRs 300 may include a memory location 302 to store a mutual exclusion token, referred to herein as a "mutex," and a range of memory locations 304.1-304.N to provide data storage for a thread possessing the mutex.

The MSRs 300 may be allocated in a memory region 312 of a processor 310. The processor may include a plurality of processing cores 314.1-314.M. Each of the cores 314.1-314.M may include one or more processing threads, labeled "Thread 1"-"Thread X." The MSRs 300 may be accessible to any thread of any core 314.1-314.M, however, only a single thread at a time may access the MSRs.

The MSRs 300 may provide for a single thread to access the specific memory region 304.1-304.N for certain processing tasks without disabling processing activity for the remaining threads. In this manner, the MSRs 300 may provide improvements in overall processing efficiency for the processor 310 as compared to processing efficiency when the processor may be in a system management mode.

Microcode executed in a controller 320 within the processor 310 may manage access to the specific memory range 304.1-304.N based on ownership of the mutex. For example, say a processing task for Thread 1 within core 312.1 desires read/write access to the memory range 304.1-304.N. Thread 1 may read memory space 302 to determine if the mutex is available, and if the mutex is available, Thread 1 may claim the mutex. The reading the memory space 302 and claiming the mutex may be performed in an autonomous operation. If the mutex is not available, Thread 1 may not claim the mutex. If Thread 1 cannot claim the mutex, the controller 320 may return a predetermined status indicator to Thread 1 that may indicate that the thread was not allowed to claim the mutex.

However, if Thread 1 is allowed to claim the mutex, the controller 320 may initialize the memory range 304.1-304.N to a predetermined initialization value, and thereafter, Thread 1 may read and/or write data to the memory range 304.1-304.N. Thread 1 may release ownership of the mutex upon completion of its processing tasks.

In an embodiment, if a thread is denied from claiming the mutex, the thread may continue to poll the mutex memory location 302, according to a predetermined polling period, in order to claim the mutex. The polling may not disable other processing tasks for the thread.

In an embodiment, the controller 320 may verify ownership of the mutex for each read and/or write attempt to the memory range 304.1-304.N. A predetermined error code may be returned to a thread attempting to access the memory range that does not possess the mutex.

In an embodiment, the controller 320 may be provided within read only memory ("ROM") within the processor 310 having instructions thereon configured to manage access to the memory range 304.1-304.N. In an embodiment, the MSRs 300 may be provided in shared cache units of the processor 310.

Figure 4:
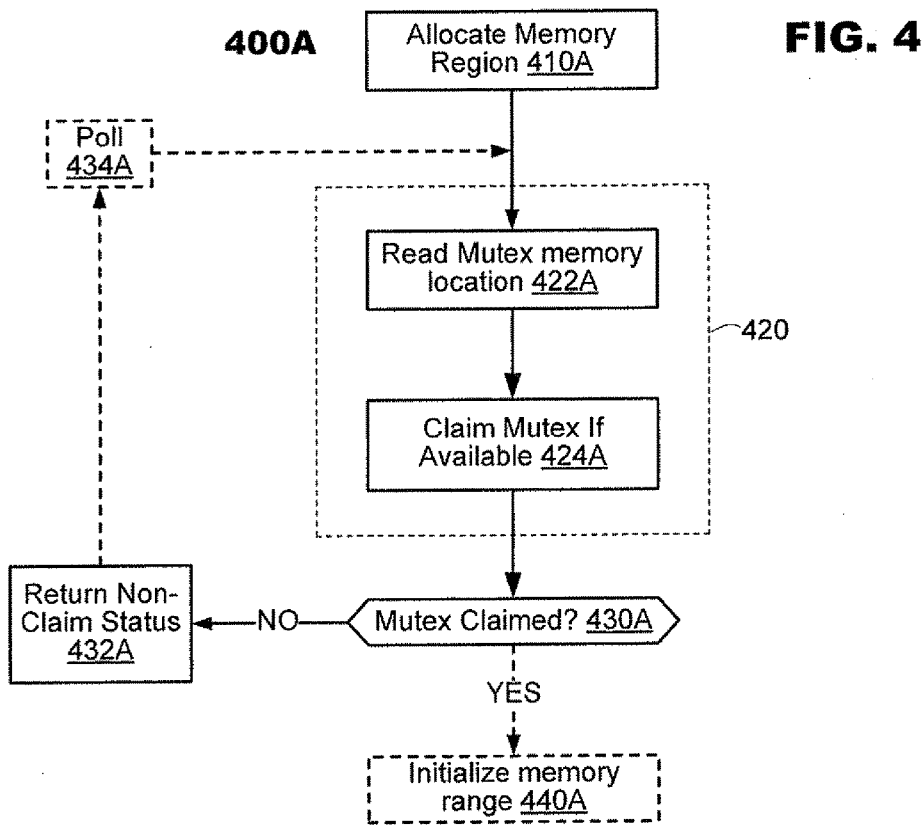
FIG. 4 illustrates a flow diagram of a process for providing access to a specific memory region according one embodiment.

FIG. 4A is a flow diagram illustrating a process 400A for managing single thread access to a predetermined memory region according to one embodiment of the present invention. At step 410A, the process may allocate the predetermined memory region within a processor. At step 420A, a processing thread desiring access to the predetermined memory region may determine if the mutex may be claimed. The determining may be an autonomous operation include reading, by the processing thread, a mutex memory location (step 422A) and claiming the mutex if it is available (step 424A). At step 430, the process may check if the mutex was claimed by the thread. If the mutex was not claimed, the process may return a status indicator to the thread that the mutex was not claimed (step 432A).

In an embodiment, if the mutex was claimed, the process 400A may initialize each of a predetermined range of memory locations in the predetermined memory region to an initialization value (step 440A). In another embodiment, if the mutex is not available, the processing thread may poll the mutex memory location to check availability of the mutex (step 434A). In another embodiment, a thread may release the mutex upon completion of its processing task which utilizes the predetermined memory region. In another embodiment, the process may re-initialize each of the memory locations of the predetermined memory region to the initialization value upon release of mutex ownership by a processing thread.

FIG. 4B is a flow diagram illustrating a process 400B for managing single thread access to a predetermined memory region according to one embodiment of the present invention. At step 410B, the process may check mutex ownership of a thread attempting to access a memory location(s) within the predetermined memory region. The process may determine if the thread owns the mutex (step 420B). If the thread owns the mutex, the process 400B may allow access to the memory location(s) within the predetermined memory region. If the thread does not own the mutex, the process may deny access to the memory location(s) (step 422B) and return an error code to the thread attempting to access the memory location(s) (step 424B).

Instructions and processing logic to provide single thread access to a specific memory region without suspending processing activity for all other cores and/or threads within or in association with a processor, computer system, or other processing apparatus. Single thread access may be provided through implementation of microcode which may control thread access to model specific registers ("MSRs") within a processor. One MSR may provide a mutex, which a single thread may claim, and another MSR may provide a range of memory locations, which may be accessed by the thread that has claimed the mutex. Microcode within a processor may maintain access to the MSRs.

Embodiments of the present invention provide single thread access to a specific memory region without suspending processing activity for all other cores and/or threads within a processor.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories ("CD-ROMs"), compact disk rewritable's ("CD-RWs"), and magneto-optical disks, semiconductor devices such as read-only memories ("ROMs"), random access memories ("RAMs") such as dynamic random access memories ("DRAMs"), static random access memories ("SRAMs"), erasable programmable read-only memories ("EPROMs"), flash memories, electrically erasable programmable read-only memories ("EEPROMs"), magnetic or optical cards, or any other type of media suitable for storing electronic instructions.

Accordingly, embodiments of the invention also include non-transitory, tangible machine-readable media containing instructions or containing design data, such as Hardware Description Language ("HDL"), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor, comprising:
a first model specific register within a processor to store a mutex, possession of the mutex by only one of a plurality of requesters to enable read/write access to a predetermined range of second memory locations stored within a second model specific register for a mutex possessing requester without suspending processing activity for all other cores and the plurality of requestors within the processor,
logic to allow mutex possession by a requester of the plurality of requesters if the mutex is available;
logic to deny mutex possession by a requester of the plurality of requesters if the mutex is unavailable;
logic to disable read/write access to the predetermined range of second memory locations for a non-possessing requester of the piurality of requesters, wherein the non-possessing requester is a requester not in possession of the mutex, and
returning a predetermined error code to the non-possessing requester for attempts by the non-possessing requester to access the predetermined range of second memory locations, the predetermined error code causing the non-possessing requester to poll the mutex for availability after a predetermined period of time during which the non-possessing requester performs other processing tasks;
logic to release possession of the mutex by the mutex possessing requester of the plurality of requesters upon completion of a processing task by the mutex possessing requester.

2. The processor of claim 1, wherein the processor is a single core processor and the plurality of requesters are processing threads in the single core processor.

3. The processor of claim 1, wherein the processor is a multi-core processor and the plurality of requesters are processing threads within a different cores of the processor.

4. The processor of claim 1, wherein the predetermined range of second memory locations is an array of model specific registers.

5. The processor of claim 1, wherein the predetermined range of second memory locations are set to a predetermined value when the mutex is released by a requester.

6. The processor of claim 1, wherein the predetermined range of second memory locations are set to a predetermined value when a requester is allowed to possess the mutex.

7. A non-transitory machine-readable medium, which is not a signal bearing medium, having stored thereon data, which if executed by a processor, causes the processor to perform a method, the method comprising:
 allocating a predetermined range of memory locations, the memory locations including a first model specific register within a processor to provide storage for a mutex token and a plurality of second memory locations stored within a second model specific register, each to provide temporary data storage;
 reading, by a first requester of a plurality of requesters attempting to access the plurality of second memory locations, the first memory location to determine availability of the mutex;
 if the mutex is available, allowing possession of the mutex by only the first requester; enabling read/write access to the first requester to the plurality second memory locations without suspending processing activity for all other cores and the plurality of requestors within the processor;
 if the mutex is unavailable, denying possession of the mutex by the first requester; checking ownership of the mutex by a second requester attempting to access the plurality of second memory locations;
 if the second requester owns the mutex, allowing the second requester access to the plurality of second memory locations; and
 if the second requester does not own the mutex, denying the second requester access to the plurality of second memory locations and returning a predetermined error code to the second requester, the error code indicating an invalid attempt to access the plurality of second memory locations, the predetermined error code causing the non-possessing requester to poll the mutex for availability after a predetermined period of time during which the non-possessing requester performs other processing tasks.

8. The non-transitory machine-readable medium of claim 7, the reading further comprising: if the mutex is available, setting a predetermined initialization value for each of the plurality of second memory locations.

9. The non-transitory machine-readable medium of claim 7, the reading further comprising: if the mutex is unavailable, returning a predetermined status indicator to the requester indicating that the mutex is unavailable for possession by the requester.

10. The non-transitory machine-readable medium of claim 7, the method further comprising: releasing, by a requester possessing the mutex, possession of the mutex upon completion of a processing task performed by the requester.

11. The non-transitory machine-readable medium of claim 7, wherein the requester is a processing thread within a processing core of the processor.

12. A method, comprising:
 allocating a predetermined range of memory locations within a processor, the memory locations including a first memory location to provide storage for a mutex token and a plurality of second memory locations, each to provide temporary data storage, wherein the predetermined range of memory locations are model specific registers within the processor;
 reading, by a first requester attempting to access the plurality of second memory locations, the first memory location to determine availability of the mutex;
 if the mutex is available, allowing possession of the mutex by the first requester; enabling read/write access to the first requester to the plurality second memory locations;
 if the mutex is unavailable, denying possession of the mutex by the first requester; checking ownership of the mutex by a second requester attempting to access the plurality of second memory locations;
 if the second requester owns the mutex,
 allowing the second requester access to the plurality of second memory locations;
 if the second requester does not own the mutex,
 denying the second requester access to the plurality of second memory locations and returning the predetermined error code to the second requester, the error code indicating an invalid attempt to access the plurality of second memory locations, the predetermined error code causing the non-possessing requester to poll the mutex for availability after a predetermined period of time during which the non-possessing requester performs other processing tasks.

13. The method of claim 12, the reading further comprising: if the mutex is available, setting a predetermined initialization value for each of the plurality of second memory locations.

14. The method of claim 12, the reading further comprising: if the mutex is unavailable, returning a predetermined status indicator to the requester indicating that the mutex is unavailable for possession by the requester.

15. The method of claim 12, further comprising: releasing, by a requester possessing the mutex, possession of the mutex upon completion of a processing task performed by the requester.

16. The method of claim 12, wherein the requester is a processing thread within a processing core of the processor.

17. A system, comprising:
 system memory to store at least one of instructions and data; a processor coupled to said system memory, said processor including a first model specific register within a processor to store a mutex, possession of the mutex by ony one of a plurality of requesters to enable read/write access to a predetermined range of second memory locations stored within a second model specific register for a mutex possessing requester without suspending processing activity for all other cores and the plurality of requestors within the processor, wherein the first memory location is a model specific register within the processor;
 logic to allow mutex possession by a requester if the mutex is available; logic to deny mutex possession by a requester if the mutex is unavailable; logic to disable read/write access to the predetermined range of second memory locations for a nor-possessing requester, wherein the non-possessing requester is a requester not in possession of the mutex, by returning a predetermined error code to the non-possessing requester for attempts by the non-possessing requester to access the predetermined range of second memory locations, the predetermined error code causing the non-possessing requester to poll the mutex for availability after a predetermined period of time during which the nan-possessing requester performs other processing tasks;

logic to release possession of the mutex by a mutex possessing requester upon completion of a processing task by the mutex possessing requester.

18. The system of claim 17, wherein the processor is a single core processor and the requester is a processing thread.

19. The system of claim 17, wherein the processor is a multi-core processor and the requester is a processing thread within a core of the processor.

20. The system of claim 17, wherein the predetermined range of second memory locations is an array of model specific registers.

21. The system of claim 17, wherein the predetermined range of second memory locations are set to a predetermined value when the mutex is released by a requester.

22. The system of claim 17, wherein the predetermined range of second memory locations are set to a predetermined value when a requester is allowed to possess the mutex.

* * * * *